(12) United States Patent
Yabuki et al.

(10) Patent No.: US 6,868,755 B2
(45) Date of Patent: Mar. 22, 2005

(54) MANUFACTURING METHOD OF DIAMOND CUTTER

(75) Inventors: Hiroyasu Yabuki, Shiraoka-machi (JP); Kiyoshi Bando, Shiraoka-machi (JP); Masafumi Shimizu, Tokyo (JP)

(73) Assignee: Riken Diamond Industry Co. Ltd, Tokyo (JP)

( * ) Notice: Subject to any disclaimer, the term of this patent is extended or adjusted under 35 U.S.C. 154(b) by 102 days.

(21) Appl. No.: 10/298,031

(22) Filed: Nov. 15, 2002

(65) Prior Publication Data

US 2003/0121369 A1 Jul. 3, 2003

(30) Foreign Application Priority Data

Nov. 15, 2001 (JP) ........................................ 2001-349832

(51) Int. Cl.[7] .............................................. B23D 63/00
(52) U.S. Cl. ........................................ 76/115; 76/112
(58) Field of Search ............................. 76/101.1, 115, 76/116, 112, DIG. 12; 125/15; 51/309; 451/548

(56) References Cited

U.S. PATENT DOCUMENTS

| | | | | |
|---|---|---|---|---|
| 849,329 A | * | 4/1907 | Colthar ........................ | 72/340 |
| 2,472,876 A | * | 6/1949 | Ahrndt et al. ................. | 83/676 |
| 3,069,816 A | * | 12/1962 | Pratt et al. ................... | 451/541 |
| 3,590,535 A | * | 7/1971 | Benson et al. .............. | 451/542 |
| 3,754,485 A | * | 8/1973 | Heitzman ..................... | 76/112 |
| 4,665,887 A | * | 5/1987 | Shiga ........................... | 125/15 |
| 4,854,295 A | * | 8/1989 | Sakarcan ...................... | 125/15 |
| 4,860,721 A | * | 8/1989 | Matsuda ...................... | 125/15 |
| 5,323,670 A | * | 6/1994 | Dietz ........................... | 76/112 |
| 5,471,970 A | * | 12/1995 | Sakarcan ...................... | 125/15 |
| 6,470,772 B2 | * | 10/2002 | Peisert et al. ................. | 76/112 |

* cited by examiner

Primary Examiner—Hwei-Siu Payer
(74) Attorney, Agent, or Firm—Mark D. Wieczorek

(57) ABSTRACT

A diamond cutter 7 constituted by a cutter base plate 5 having a curved surface 3 by drawing molding a steel sheet metal material is provided. The cutter base plate 5 is obtained by preparing an original plate having an axial hole 2 and a circular outer shape from the steel sheet metal material, next spinning drawing or press molding, and forming the curved surface being 3 wholly point symmetrical about the axial hole 2 between the axial hole 2 and the outer shape 1.

7 Claims, 3 Drawing Sheets

MANUFACTURING METHOD OF DIAMOND CUTTER

BACKGROUND OF THE INVENTION

The present invention relates to a manufacturing method of a diamond cutter, and more particularly to an invention in which a cutter base plate constituting a diamond cutter is formed so as to have a curved surface.

As is well known, cutting a road surface (asphalt) in a circular shape in order to form a manhole in a road, a hole for sticking up a pole or the like in a park, or the like is performed. For this purpose, a cutting apparatus in which a bit is mounted to a tip of a cylindrical casing has been conventionally used, however, since the equipment is large-scaled, a diamond cutter in which a diamond chip blade is mounted to an outer periphery of a circular cutter base plate has been gradually used. Paying attention to this diamond cutter, the circular flat diamond cutter has been conventionally manufactured by cutting a material having a comparatively high hardness in a circular shape by a laser beam cutting apparatus, applying a hardening and annealing process to the circular flat material, thereafter executing a so-called tensioning process as well as applying a grinding process, and finally attaching diamond chips to an outer periphery thereof intermittently with a fixed interval in accordance with a brazing. In the case of this circular flat diamond cutter, at a time of cutting the road surface in a circular shape for forming the manhole or the like, the cutting operation is performed by rotating the diamond cutter on its own axis and moving the diamond cutter around a center. However, there are problems such that a rotational oscillation is easily generated at a time of rotating on its own axis and moving around the center because the cutter base plate is flat, and it is hard to smoothly move around the center due to the flat cutter base plate.

Accordingly, in recent days, there has been used a diamond cutter comprising a circular cutter base plate and a diamond chip mounted on an outer periphery thereof, in which the cutter base plate is formed so as to have a curved shape between an axial hole and an outer shape, for example, formed in a parabolic antenna shape or a cup shape as a whole. For example, this is proposed in Japanese Unexamined Utility Model Publication No. 62-159510, the structure is made such that cutting the road surface in the circular shape in order to form the manhole on the road surface by using this is performed by moving the diamond cutter around the center while rotating the diamond cutter having the parabolic antenna shape mentioned above on its own axis, and the structure has an advantage that the rotational oscillation at a time of cutting is reduced, and it is possible to smoothly perform the cutting motion at a time of revolution.

However, in the case of the conventional art mentioned above, in order to form the cutter base plate for the diamond cutter so as to have the curved surface in parabolic antenna shape, a whole of the base plate has been formed in the parabolic antenna shape or the cup shape in accordance with a so-called scraping with using a material having a comparatively high hardness and further using a thick material.

Accordingly, in accordance with the conventional art mentioned above, since the base plate is formed by scraping the material having the comparatively high hardness so as to have the curved surface between the axial hole and the outer shape, there are problems that a stock utilization is low, a lot of trouble is taken for manufacturing, a lot of skill is required for a scraping process, and a manufacturing cost is high.

SUMMARY OF THE INVENTION

Accordingly, an object of the present invention is to provide a method of manufacturing a diamond cutter by which a cutter base plate having a curved surface being wholly point symmetrical about an axial hole, such as a parabolic antenna shape or the like, can be easily and simply manufactured between the axial hole and an outer shape, therefore manufacturing cost can be made low, and a strength capable of sufficiently standing against a load at a cutting time is provided to the cutter base plate.

In order to achieve the object mentioned above, the present invention has the following technical means. Then, a description will be given of the technical means by using reference numerals shown in the accompanying drawings corresponding to an embodiment. In accordance with the present invention, there is provided a method of manufacturing a diamond cutter in which a plurality of diamond chips 6 are attached to an outer periphery of a circular cutter base plate having an axial hole 2 in the center at the fixed interval, comprising the steps of:

punching a steel sheet metal material in a circular outer shape 1;

forming an axial hole 2 in the center of the outer shape 1;

next drawing so as to manufacture a cutter base plate 5 in which a curved surface 3 being wholly point symmetrical about the axial hole 2 is formed between the axial hole 2 and the outer shape 1; and sticking a plurality of diamond chips 6 to an outer periphery of the cutter base plate 5 having the curved surface 3 at a fixed interval.

As the steel sheet metal material mentioned above, it is possible to employ any one of a rolled steel for a general structural purpose (SS material) standardized by Japanese Industrial Standards JIS-G3101, a hot rolled mild steel (SPC material) standardized by JIS-G3141, a hot rolled mild steel (SPH material) standardized by JIS-G3181, a cold rolled stainless steel (SUS material) standardized by JIS-G4305, and a cold rolled stainless steel (SUS material) standardized by JIS-G4304.

Further, the manufacturing method is characterized in that a plurality of slits 4 are formed on the outer periphery of the cutter base plate 5 in which the curves surface 3 is formed, at a fixed interval, and the diamond chips 6 are brazed to the outer periphery between the slits 4.

Further, the manufacturing method is characterized in that the cutter base plate 5 obtained by drawing the steel sheet metal material is formed in a parabolic antenna shape.

In addition, the manufacturing method is characterized in that the method of drawing the steel sheet metal material can employ a spinning lathe, a press drawingmold, a spinning process or a multi drawing process.

DESCRIPTION OF THE PREFERRED EMBODIMENT

A description will be given next of a preferable embodiment in accordance with the present invention with reference to the accompanying drawings.

Figure 1:
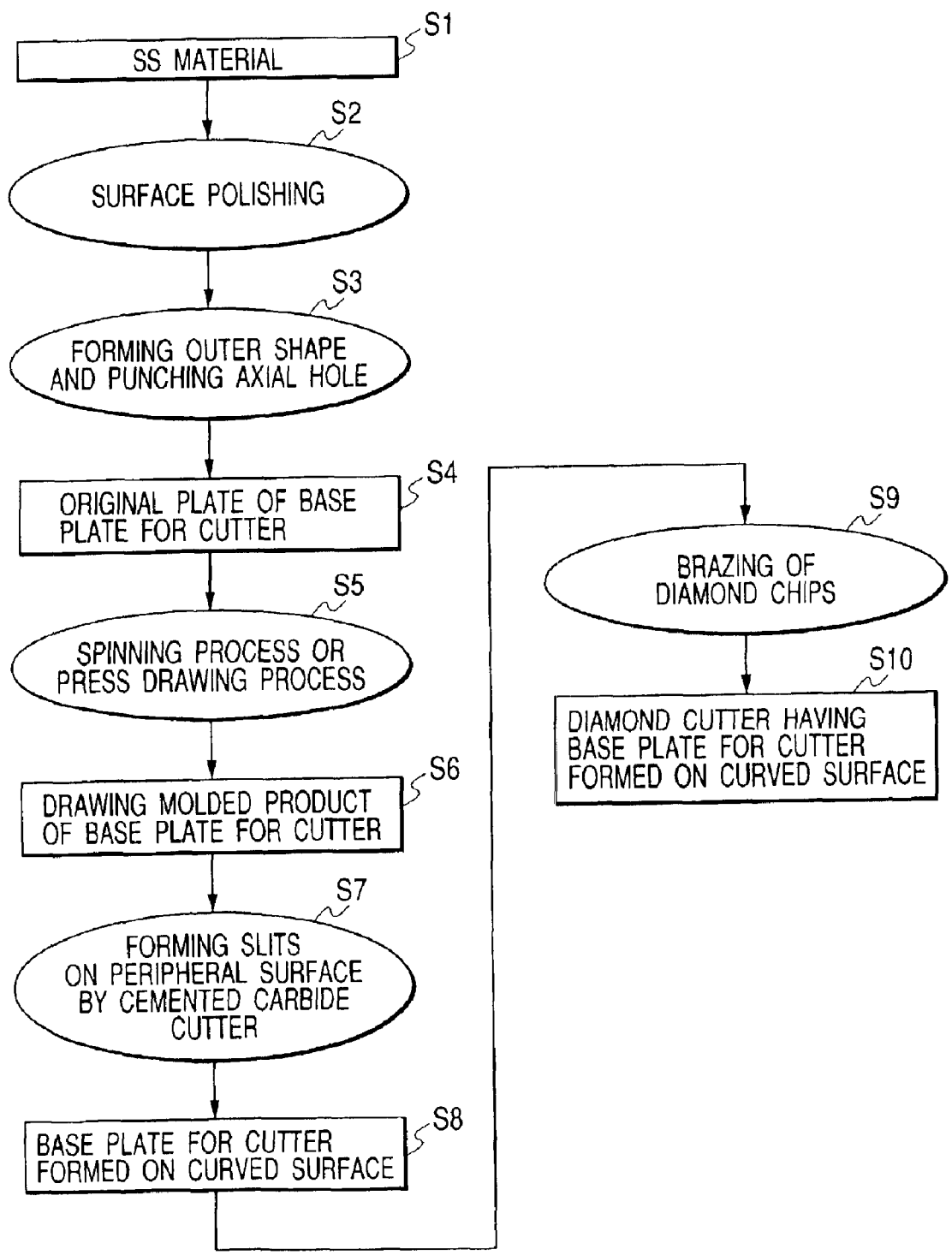
FIG. 1 is a flow chart which shows an embodiment of a method of manufacturing a diamond cutter in accordance with the present invention.

First, a description will be given of a manufacturing order of a diamond chip in accordance with the present invention with reference to FIG. 1. In a step S1, a steel sheet metal material is prepared. As the steel sheet metal material, a material having a low hardness is desirable, it is possible to employ any one of a rolled steel for a general structural purpose (SS material) standardized by Japanese Industrial Standards JIS-G3101, a cold rolled mild steel (SPC material) standardized by JIS-G3141 or a hot rolled mild steel (SPH material) standardized by JIS-G3181. Further, as a material to which a heat treatment thermal refining is not applied, it is possible to employ a cold rolled stainless steel (SUS material) standardized by JIS-G4305 or a hot rolled stainless steel (SUS material) standardized by JIS-G4304. Showing an example employing the SS material mentioned above, there is employed the SS material which is further classified finely as SS330, SS400, SS490 and SS540 (numeral means a lower limit value of a tensile strength, for example, SS400 indicates a strength of 400 to 430 $N/mm^2$) in accordance with JIS (Japanese Industrial Standards). This is because the drawing process can be easily performed in the after steps so as to have the curved surface being wholly point symmetrical about the axial hole between the axial hole and the outer shape in accordance with the spinning process or the pressing process, or the spinning process or the multi drawing process without generating any chap and crack. That is, this is for the purpose of avoiding a hardness which generates the chap and crack at the drawing time and inversely being easily drawn and achieving a sufficient strength after drawing. Accordingly, it is possible to employ a material having a hardness in a range between 99.5 and 48.0 of Rockwell hardness (B scale), and it is desirable to employ a material having a hardness in a range between 80 and 65.

Showing one example of the base plate for the diamond cutter formed to be a final product through the after steps with using the SS material, a diameter is 305 mmφ (12 inches), a curvature of the base plate (a curvature of the curved surface) is 394 mm, a thickness is 3 mm, the curved surface is formed between the axial hole and the outer shape, a depth of the curved surface is 50 mm, and a hardness of the SS material is a hardness of Rockwell hardness of 65.

Further, showing an example employing the SPC material mentioned above, in accordance with the JIS, the SPC material is further classified finely into SPCC (for general purpose, tensile strength 270 $N/mm^2$, and elongation percentage 32 to 39% or more), SPCD (for drawing, tensile strength 270 $N/mm^2$, and elongation percentage 35 to 41% or more), and SPCE (for deep drawing, tensile strength 270 $N/mm^2$ or more, and elongation percentage 36 to 43% or more), however, the SPCC material mentioned above is employed. In this case, 1 $N/mm^2 \approx 0.102$ $kgf/mm^2$.

As a result, there is obtained the base plate for the diamond cutter via the steps described blow, the base plate for the diamond cutter being structured such that the diameter is 1,061.51 mmφ, the curvature of the base plate (the curvature of the curved surface) is 530.75 mm, the thickness is 3 mm, the curved surface is formed between the axial hole and the outer shape, and the depth of the curved surface is 53.38 mm.

Next, a necessary surface polish is performed in a step S2, and the circular outer shape 1 and the circular center axial hole 2 are formed in accordance with a press punching in a step S3. A necessary surface polish is further performed after forming shapes of the outer shape 1 and the axial hole 2. Thus, an original plate for the cutter base plate is obtained in a step S4.

Figure 2:
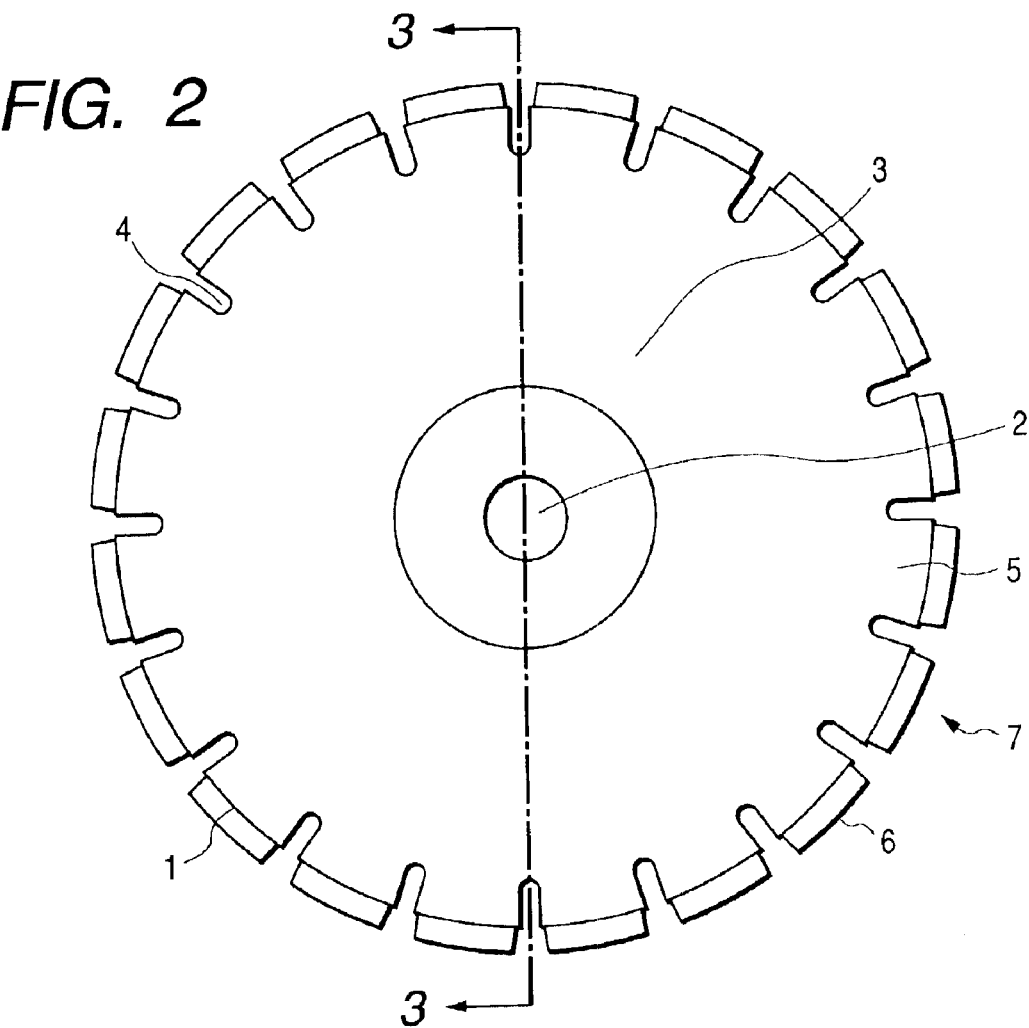
FIG. 2 is a plan view of the diamond cutter which is manufactured by the manufacturing method of the flow chart shown in FIG. 1.
Figure 4:
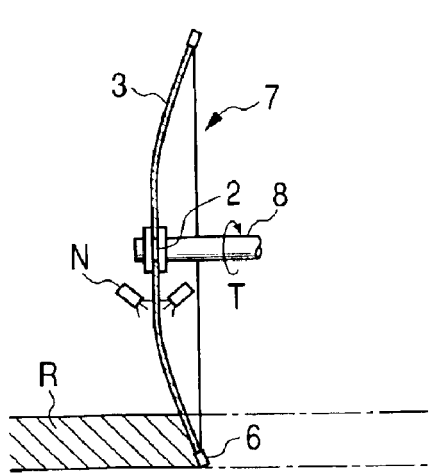
FIG. 4 is a cross sectional view which shows an example of how the diamond cutter shown in FIG. 3 is used, and shows a part cutting a road surface.
Figure 3:
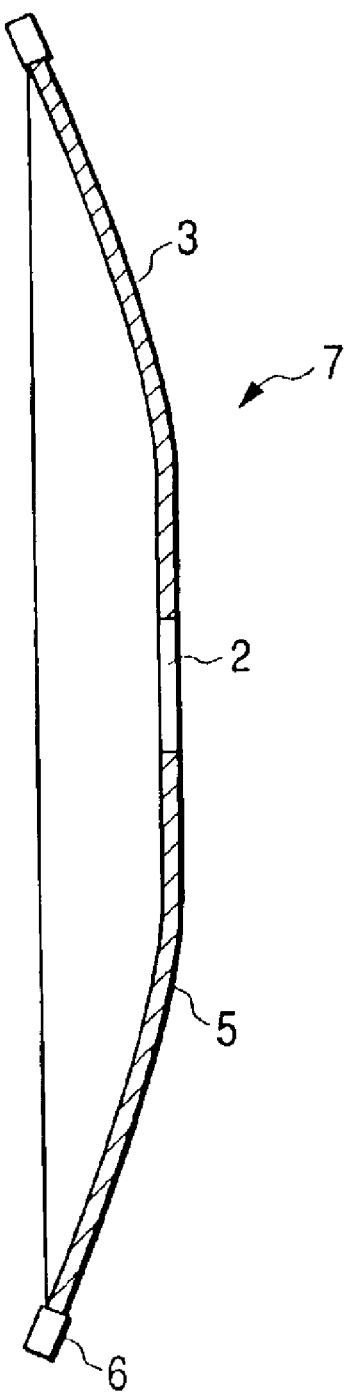
FIG. 3 is a cross sectional view of the diamond cutter shown along a line 3—3 in FIG. 2.

Then, in a next step S5, the original plate for the cutter mentioned above is spinning processed. That is, the drawing process is performed so as to attach the SS material punched in the circular shape to a rotary shaft of the spinning lathe with using the axial hole 2, attach the cup-shaped spinning mold formed in the previously prepared curved surface to the rotary shaft, rotate both of the circular SS material and the mold, and press the SS material to the cup-shaped mold by a spatula, thereby wholly forming the parabolic antenna shape. Thus, the drawing molded product of the cutter base plate is obtained in a step S6. FIGS. 2 and 3 show one example of the drawing molded product of the cutter base plate drawn in the parabolic antenna shape as a whole obtained thereby. In the manner mentioned above, the curved surface 3 which is wholly point symmetrical about the axial hole 2 is formed between the axial hole 2 and the outer shape 1. That is, in this embodiment, the whole is in the parabolic antenna shape. Accordingly, the point symmetric in this case means that the respective portions in bilateral symmetrical positions are formed in a uniform symmetrical shape about the center of the axial hole 2. In the case of the cutter base plate having the curved surface 3, the rotational oscillation is less than the flat cutter base plate, and the shape of the curved surface increases the strength of the whole.

Next, as shown in a step S7, the slits 4 are formed in the outer shape 1 at a fixed interval. Deburring is performed after forming the slit 4. The slits 4 are formed for the purpose of increasing a contact area with the air so as to increase a heat dissipation effect at a time of using the diamond cutter to rotationally cut the subject, improving a contact effect of a cooling water with the cutter base plate at a time of rotationally cutting, or playing a role in a groove for discharging chips at a time of rotationally cutting. Further, the slits 4 are formed after the spinning lathe step in the step S5 mentioned above because the slits 4 are partly broken or the like so as not to be formed in a predetermined shape if the slits 4 are formed in the cutter base plate before the drawing process. Therefore, the slits 4 are formed after the drawing process. Accordingly, the cutter base plate 5 in which the curved surface 3 is formed is obtained as shown in a step S8.

Thereafter, the process goes to a step S9, and the diamond chips 6 are silver brazed to the outer periphery of the cutter base plate 5 so as to be positioned between the slits 4. Accordingly, a diamond cutter 7 having the cutter base plate 5 formed with the curved surface 3 is manufactured. In this case, in place of the silver brazing mentioned above, the diamond chips may be stuck by using a laser beam welding or the like.

Figure 5:
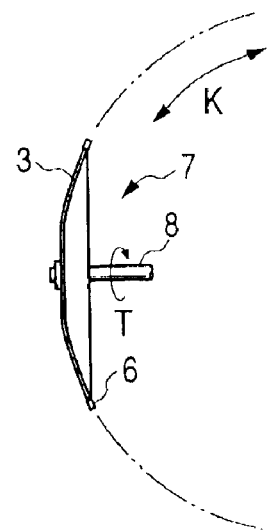
FIG. 5 is a plan view which shows the example of how the diamond cutter shown in FIG. 3 is used, and shows the part cutting the road surface.

In order to cut a road surface R or the like in a circular shape by using the diamond cutter 7 mentioned above, the road surface R can be cut in the circular shape, for example, as shown in FIG. 5, by attaching a rotary shaft 8 of a cutter apparatus (not shown) to the axial hole 2 of the diamond cutter 7, discharging a cooling water from a cooling water nozzle while rotating T the diamond cutter 7 on its own axis due to a rotation of the rotary shaft 8, and as shown in FIG. 6, revolving K the diamond cutter 7. The road surface R can be cut in the circular shape in the manner mentioned above. Further, since the cutter base plate 5 of the diamond cutter 7 has the curved surface 3 formed point symmetrically about the axial hole 2 between the axial hole 2 and the outer shape 1, the rotational oscillation is reduced, and the whole strength is reinforced by the curved shape. Accordingly, it is possible to sufficiently stand against the cutting load even in the drawing molded product of the SS material.

As described above in detail, in accordance with the invention described in the first, second, third, fourth and fifth aspects, it is possible to easily and simply manufacture the diamond cutter having the cutter base plate with the curved surface being wholly point symmetrical about the axial hole between the axial hole and the outer shape with a low cost and a uniform quality, by the drawing mold in accordance with the spinning lathe or the press. Further, the strength is increased by the curved shape between the axial hole and the outer shape, whereby it is possible to sufficiently stand against the load of cutting the road surface or the like.

Further, in accordance with the invention described in the sixth aspect, in addition to the advantage mentioned above, since the slits 4 are formed after forming the curved surface in accordance with the spinning lathe or the press drawing, it is possible to accurately form the slits at the defined positions in spite of the curved shape obtained by the drawing.

What is claimed is:

1. A method of manufacturing a diamond cutter in which a plurality of diamond chips (6) are attached to an outer periphery of a circular cutter base plate having an axial hole (2) in the center at a fixed interval, comprising the steps of:

punching a steel sheet metal material in a circular outer shape (1);

forming an axial hole (2) in the center of the outer shape (1);

next drawing said steel sheet material so as to manufacture a cutter base plate (5) in which a curved surface (3) being wholly point symmetrical about the axial hole (2) is formed between said axial hole (2) and the outer shape (1); and sticking a plurality of diamond chips (6) to an outer periphery of the cutter base plate (5) having the curved surface (3) at a fixed interval.

2. A method of manufacturing a diamond cutter as claimed in claim 1, wherein said steel sheet metal material is a rolled steel for a general structural purpose (SS material).

3. A method of manufacturing a diamond cutter as claimed in claim 1, wherein said steel sheet metal is a cold rolled mild steel (SPC material).

4. A method of manufacturing a diamond cutter as claimed in claim 1, wherein said steel sheet metal material is a hot rolled mild steel (SPH material).

5. A method of manufacturing a diamond cutter as claimed in claim 1, wherein said steel sheet metal material is a cold rolled or a hot rolled stainless steel (SUS material).

6. A method of manufacturing a diamond cutter as claimed in claim 1, wherein a plurality of slits (4) are formed on the outer periphery of the cutter base plate (5) in which said curved surface (3) is formed, at a fixed interval, and said diamond chips (6) are brazed to the outer periphery between said slits (4).

7. A method of manufacturing a diamond cutter as claimed in claim 1, wherein the cutter base plate (5) obtained by drawing said steel sheet metal material and having the curved surface (3) is wholly formed in a parabolic antenna shape.

\* \* \* \* \*